United States Patent [19]

Kato et al.

[11] 4,053,175
[45] Oct. 11, 1977

[54] PASSIVE SEAT BELT SYSTEM

[75] Inventors: Masumi Kato, Toyoake; Shigenori Kanazawa, Toyota; Kiyomitsu Oshikawa, Kariya, all of Japan

[73] Assignee: Nippondenso Co., Ltd., Kariya, Japan

[21] Appl. No.: 685,709

[22] Filed: May 12, 1976

Related U.S. Application Data

[62] Division of Ser. No. 595,319, July 11, 1975, Pat. No. 4,004,829.

[30] Foreign Application Priority Data

July 17, 1974 Japan .................................. 49-82608
July 29, 1974 Japan .................................. 49-86777
July 30, 1974 Japan .................................. 49-87852

[51] Int. Cl.² .......................................... B60R 21/02
[52] U.S. Cl. ................................................ 280/745
[58] Field of Search ............... 280/745, 748; 297/388, 297/389; 180/82 C

[56] References Cited

U.S. PATENT DOCUMENTS 3,779,578 12/1973 Spahl .................................. 280/745
3,856,327 12/1974 Otani .................................. 280/745

*Primary Examiner*—Robert R. Song
*Attorney, Agent, or Firm*—Cushman, Darby & Cushman

[57] ABSTRACT

A passive seat belt system having a seat belt for restraining a wearer in the seat from being thrown away when large acceleration or deceleration has been exerted on the wearer, a reinforcing strip combined with the seat belt to give the seat belt a rigidity so that the seat belt can stretch by the help of only the above reinforcing strip, and a driving unit connected with the reinforcing strip for driving the strip so that the seat belt can automatically be stretched forward over the seat, whereby the wearer gets in and out of a vehicle very freely.

6 Claims, 22 Drawing Figures

PASSIVE SEAT BELT SYSTEM

RELATED APPLICATION

This application is a division of our copending parent application Ser. No. 595,319, filed July 11, 1975 now U.S. Pat. No. 4,004,829.

BACKGROUND OF THE INVENTION

This invention relates to a passive seat belt system for vehicles which automatically fastens and unfastens the seat belt in accordance with wearer's intentional movement of getting in and out.

Conventionally, the seat belt is fastened and unfastened manuallly. However, because of the troublesomeness, such as seat belt system has not been always used, resulting in poor protection of unbelted occupants. To cope therewith, it has been proposed to fasten and unfasten the seat belt automatically. However, such a system also provides an obstacle for the free entry and exit of the occupants, because of its many complex parts, such as rails, hangers, limit switches and so on, which result in high cost and poor reliability.

SUMMARY OF THE INVENTION

The object of the present invention is to provide a simple passive seat belt system which can achieve sufficient automatic fastening and unfastening of the seat belt at low cost and with high reliability.

Another object of the present invention is to provide a passive seat belt system having a convex spring on a ordinary seat belt so as to give the seat belt a rigidity so that it functions as a complete passive seat belt with simple construction and low cost. Another object of the present invention is to provide a passive seat belt system having a strip of spring which is inserted into a tubular seat belt so as to give the seat belt a rigidity, thereby fastening and unfastening the seat belt automatically.

Another object of the present invention is to provide a passive seat belt system having two strips of spring, each of which has different length with each other, inserted also into a tubular seat belt so as to give the seat belt rigidity, thereby obtaining automatic fastening and unfastening operations with low cost and high reliability.

Another objects, features and advantages of the present invention will become apparent from the following detailed description of the preferred embodiment.

DETAILED DESCRIPTION OF PREFERRED EMBODIMENTS

Figure 1:
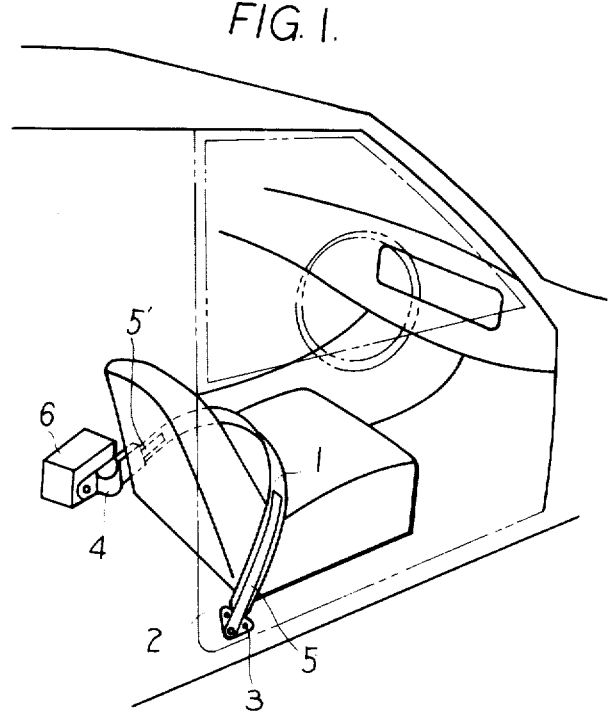
FIG. 1 is a schematic view of an embodiment of passive seat belt system of the present invention in closed-door condition.
Figure 2:
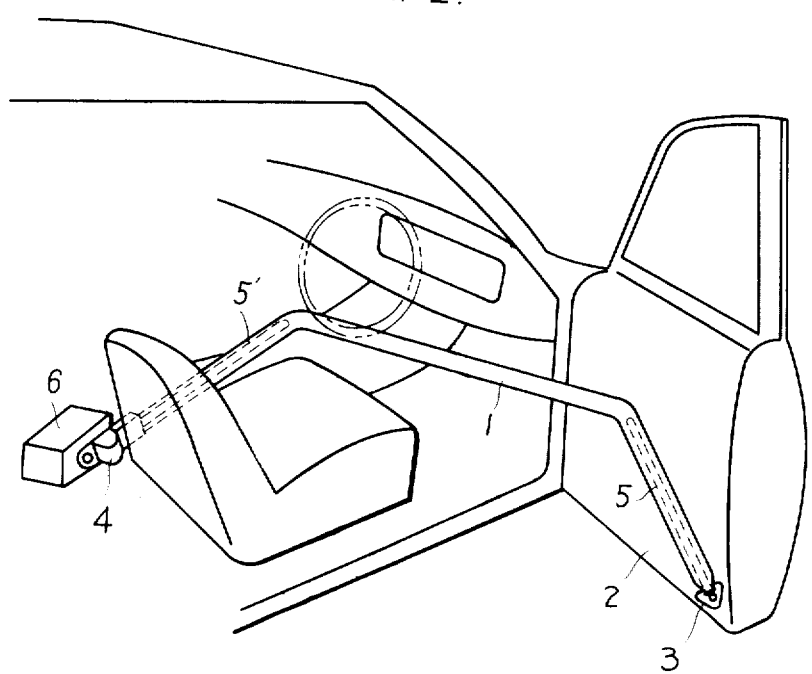
FIG. 2 is a schematic view of the embodiment shown in FIG. 1 in open-door condition.
Figure 3:
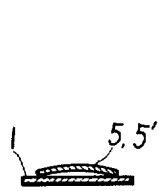
FIG. 3 is a cross-sectional view of the seat belt of the passive seat belt system.

Referring first to FIGS. 1 and 2, one end of the seat belt 1 is fastened to a rear and lower position of the door 2 through an anchor 3, while the other end is fastened to a retractor 4 fixed on the center of the floor of the vehicle. On one side of the seat belt 1 near the door 2 is fixed a strip of convex metal sheet 5 which has an arched cross-section and develops a rigidity against a bending force in a direction from its end to the swelling center, while having little rigidity against a bending force in the reverse direction. On one side of the seat belt 1 near the retractor 4 is fixed another convex metal sheet strip 5' the same as the strip 5 above. The convex metal sheet 5 or 5' is of the type such as well-known convex strips which are easily pulled out in a straight line. As in FIG. 3, the convex metal sheet is stitched or bonded to the seat belt. The length of the sheets 5 and 5' is chosen not to contact with or bother the occupants in the closed-door condition. A driving unit 6 pulls out the seat belt 1 by the convex metal sheet in accordance with closing or opening of the door 2 and with the pulled out length of the seat belt 1. When the door 2 is closed as in FIG. 1, the retractor 4 retracts the seat belt 1 so that the seat belt can restrain the occupants. The seat belt 1 is pulled out by the driving unit 6 straight from the retractor 4 towad the front portion of the cabin because of the rigidity of the convex metal sheet 5' fixed on the seat belt 1, while the seat belt 1 near the door 2 elongates straight along the surface of the door 2 because of the rigidity of the convex metal sheet 5, thereby to set the seat belt 1 automatically in a suitable manner not to interrupt the occupant's free entry and exit.

Figure 4:
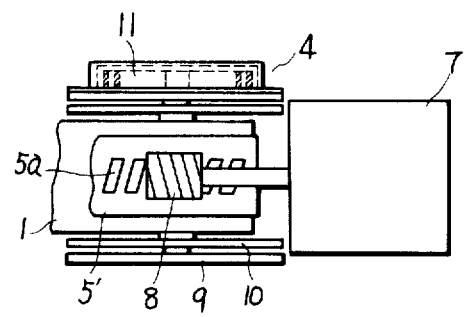
FIGS. 4 and 5 show schematic views of the driving unit of the passive seat belt system.
Figure 5:
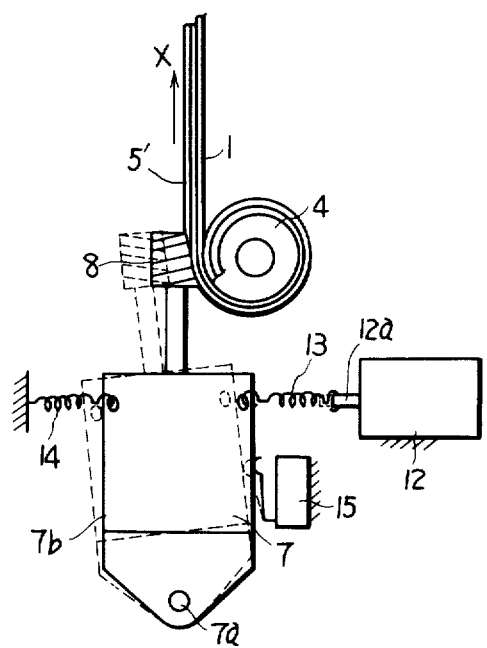
Figure 6:
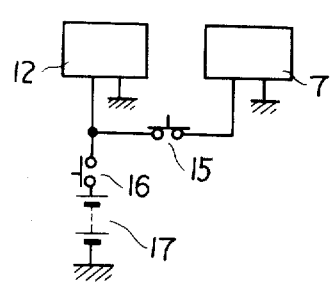
FIG. 6 shows an electric circuit for the driving unit shown in FIG. 4 and 5.

Referring next to FIGS. 4, 5 and 6, a motor 7 operates as a power source of the driving unit 6, wherein there is provided a worm gear 8 at an end of a shaft of the motor 7. The worm gear 8 engages with grooves 5a formed on the convex metal sheet 5' to enable the motor 8 to pull out the seat belt 1 from the retractor 4. The retractor 4 consists of a body 9 fixed on the vehicle body, a reel 10 rotatable with respect to the body 9 and connected with the end of the seat belt 1, a retracting spring 11 exerting retracting force to the reel 10 and a locking mechanism (not shown) for locking the seat belt when acceleration or deceleration above a preset level is developed on the vehicle.

The motor 7 is fixed rotatably on an aperture 7a formed in a housing 7b as shown in FIG. 5. A solenoid 12 is energized when the door 2 is opened to draw an armature 12a. To the housing 7b of the motor 7 are fixed one ends of springs 13 and 14, while the other ends of which are connected to the armature 12a and vehicle body respectively. When the door is closed, the worm gear 8 is detached from the convex metal sheet 5', since the motor 7 and worm gear 8 are then positioned as shown by a broken line in FIG. 5. As the seat belt is pulled out, the worm gear 8, and the motor, are gradually shifted to the right. Numeral 15 is a normally closed limit switch which opens and closes in accordance with the position of the motor 7, i.e., when the pulled out length of seat belt 1 reaches a preset value to have a preset clearance between the motor 7 and itself, the limit switch 15 opens. As shown in FIG. 6, the limit switch 15 is connected to the motor 7 and battery 17 so as to energize the motor 7 in response to its closure. A door switch 16 is connected to the battery 17 to energize both motor 7 and solenoid 12 in response to its closure.

Figure 7:
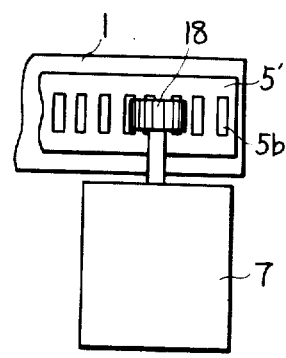
FIG. 7 and 8 show schematic views of the other embodiments respectively.
Figure 8:
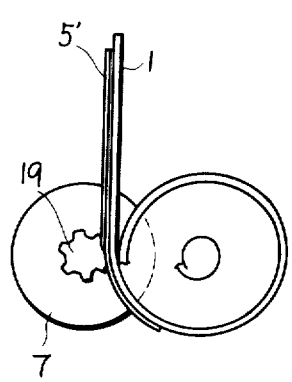

The operation of the above constructed embodiment will be explained below. When the door 2 is in closed condition, the door switch 16 is in an open state to deenergize the solenoid 12; therefore the motor 7 is positioned at a location shown in broken line in FIG. 5 by the action of the spring 14. Consequently the worm gear 8 does not engage with the grooves 5a of the convex metal sheet 5', therefore the retractor 4 fully retracts the seat belt 1 by the retracting spring 11 as shown in FIG. 1. However, if the occupant is in the seat, the seat belt 1 is not fully retracted, a portion sufficient for securing the occupant remaining. On the other hand, when the door 2 is opened, the door switch 16 is closed so that the solenoid 12 is energized, therefore the armature 12a draws the motor 7 through the spring 13 until the worm gear 8 engages with the grooves 5a. Since the limit switch 15 is of normally closed type, the motor 7 begins rotation, upon opening the door 2, therefore the seat belt 1 is pulled out in the direction of an arrow X in FIG. 5. The seat belt 1 is thus pulled out to extend straight because of the rigidity of the convex metal sheet 5' fixed on the seat belt 1. On the other hand, the seat belt 1 coming from the anchor 3 also becomes straight over the surface of the door 2 because of the rigidity of the convex metal sheet 5. When the seat belt 1 is continuously pulled out from the retractor 4, the motor 7 gradually moves toward the limit switch 15 and when the length of the pulled out seat belt 1 reaches the definate value, the motor 7 pushes the limit switch 15 so as to open it, therefore the motor 7 is deenergized to terminate the pulling out of the seat belt 1. However, since the solenoid 12 is still energized so as to draw the armature 12a, holding the engagement of the worm gear 8 and grooves 5a, the seat belt 1 is not pulled in by the retracting spring 11 of the retractor 4 so that the seat belt 1 is held in the position of FIG. 2. Therefore the occupant can easily get in and out of the vehicle without being obstructed by the seat belt. When the door 2 is closed after the occupant gets into or out of the vehicle, the door switch 16 is opened immediately so as to deenergize the solenoid 12, therefore the motor 7 returns to the position shown in broken line in FIG. 5 by the force of spring 14. In this moment, as the worm gear 8 separates from the convex metal sheet 5', the seat belt 1 is pulled into the retractor 4 by the retracting spring 11 to return to a position as shown in FIG. 1. A pinion gear 18 fixed on one end of the shaft 7 as shown in FIG. 7 can be substituted for the above worm gear 8. In that case, a different shape of groove 5b should be provided on the convex metal sheet 5' to engage with the pinion gear 18 as shown in the same drawing. A friction roller 19 shown in FIG. 8 can also be substituted for the worm gear 8 to pull out the seat belt 1 by the friction engagement. In this case, the convex metal sheet 5' is possibly built in the seat belt 1, which gives better appearance. Instead of the convex metal sheet 5 and 5', synthetic resin convex sheet is available for that purpose. Further, the above mechanism is also applicable to other seat belt systems consisting of two seat belts for chest and waist of the occupants.

Figure 9:
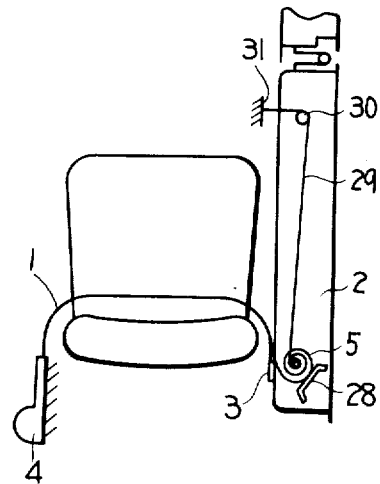
FIG. 9 shows a plan view of the other embodiment of the passive seat belt system in closed-door condition.
Figure 10:
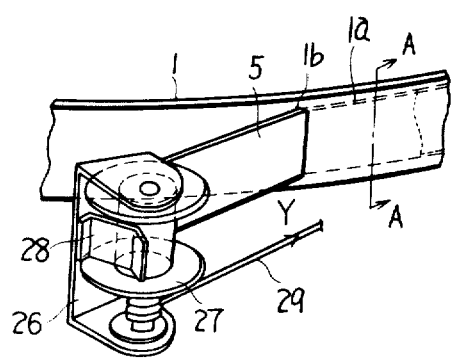
FIG. 10 shows a schematic view of the principle mechanism of the passive seat belt system shown in FIG. 9.
Figure 11:
FIG. 11 shows a cross-sectional view taken along the line A—A in FIG. 10.
Figure 12:
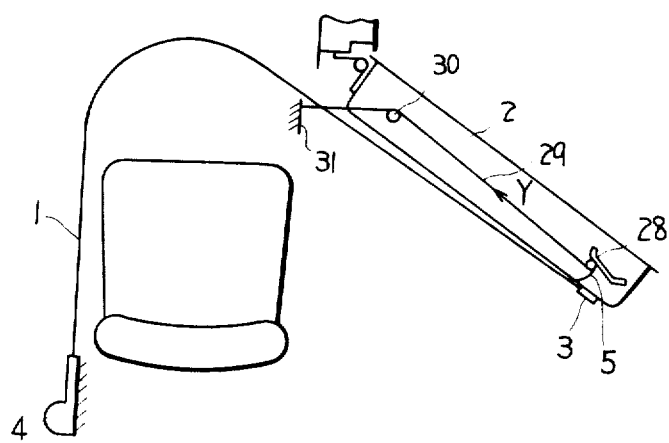
FIG. 12 shows a schematic view of the embodiment shown in FIG. 9 in open-door condition.

Referring to FIGS. 9, 10, 11 and 12, one end of the seat belt 1 is connected to the retractor 4 fixed on the floor (not shown) of the vehicle, while the other end is connected with the door 2 through the anchor 3, wherein the retractor 4 is of a known type which has a spring for always exerting a pull in a retracting direction and has a locking mechanism for locking the seat belt when an acceleration above a predetermined value is exerted on the vehicle. The seat belt 1 has a longitudinary extending thin space 1a therein into which a thin metal strip 5 which bears a rigidity in only one direction is inserted through an aperture 1b formed also in the seat belt 1. The thin metal strip 5 is of the type such as a spring for clock, convex measure and the like, which have a rigidity in one direction and elasticity in the other direction. One end of the strip 5 is connected with a reel 27 rotatably mounted on a retainer 26 fixed on the vehicle body. The strip 5 is inserted into the inner thin space 1a at one end, while most part of it is wound around the reel 27 at free condition. A stopper 28 prevents the wound strip from loosening. To the reel 27 is also connected one end of a wire 29 the other end of which is connected with a fixed point 31 through a roller 30 fixed on the door 2 without loosening. The reel 27 and wire 29 work as a driving unit. When the door 2 is closed as shown in FIG. 9, there does not arise a tension on the wire 29 so that the seat belt 1 is in a fully wound position or occupant restraining position, although the strip 5 is in a state inserting a part thereof into the inner thin space 1a. Then, when the door 2 is opened as shown in FIG. 12, the distance between the roller 30 and fixed point 31 increases, thereby exerting a pull on the wire 29 in a direction Y so that the reel 27 is energized to draw out the strip 5. In accordance with the rotation of the reel 27, the strip 5 is deeply inserted into the inner thin space 1a and then the strip 5 extends straight along the surface of the door 2 because of the rigidity of itself as shown in FIG. 12. The seat belt 1 is pulled out to the front part of cabin so that the occupant or wearer is not obstructed. When the door 2 has been closed as shown in FIG. 9, the distance between the roller 30 and fixing point 31 decreases and the pull exerted on the wire 29 disappears, so that the strip 5 is wound around the reel 27 by the winding force of itself to draw the strip 5 in the inner space 1a back to the reel 27. Therefore, the seat belt 1 loses rigidity to make it free, so that the seat belt 1 is retracted into the retractor 4 to go back to the initial full wound state or occupant restraining state. Then, the wire 29 goes back to the initial state without loosening therebetween, as the reel 27 rewinds the wire 29.

Figures 13, 14:
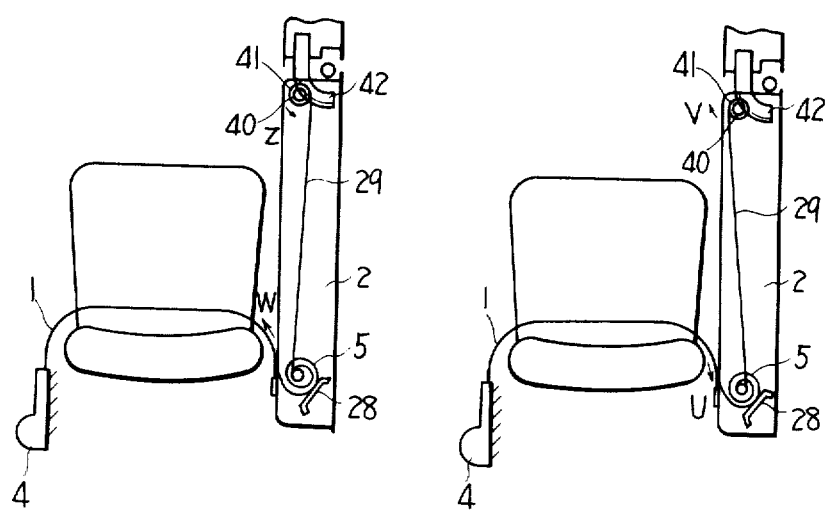
FIG. 13 shows another embodiment of the passive seat belt system in closed-door condition.
FIG. 14 shows another embodiment of the passive seat belt system in closed-door condition.

Referring to FIG. 13, there is provided a pinion 40 which is rotatably fixed on the door 2 and has a shaft 41 fixed to the pinion 40 itself. One end of the wire 29 is connected with the shaft 41. There is also provided a curved rack 42 which has a center identical with that of the door 2 so that it can engage with the pinion 40. The thin metal strip 5 is the same member as used in the above embodiment, i.e., it is wound around the reel (not shown) by the self-winding force thereof when the door 2 is closed. When the door 2 is opened, the pinion 40 which engages with the rack 42 rotates in response to the turning of the rack 42 in a direction shown Z, therefore the shaft 41 retracts the wire 29 to rotate the reel so that the strip 5 may be pulled out in a direction shown W.

In FIG. 14, the strip 5 is of the type which holds a straight pulled out figure as its free state when the door 2 is in open condition. Therefore when the door is closed, the pinion 40 engaged with the rack 42 rotates in a direction shown by V, so that the shaft 41 retracts the wire 29 to rotate the reel retracting the strip 5 in a direction shown by U. In this embodiment, the strip 5 extends deeply in the inner space 1a of the seat belt 1 by the self-elongating force so that the seat belt 1 is positioned at the front of the cabin when the door 2 is opened to take off the tension on the wire 29. Therefore the occupant can freely get into or out of the vehicle.

Figure 15:
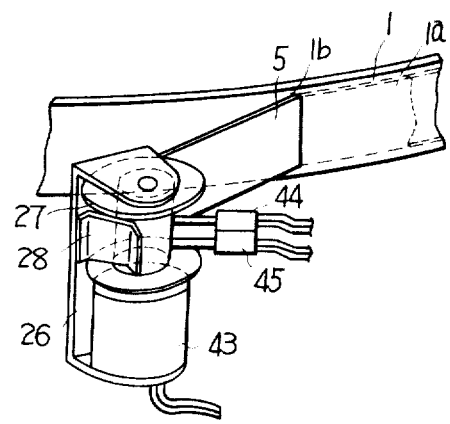
FIG. 15 shows the other embodiment of the driving unit of the passive seat belt system.
Figure 16:
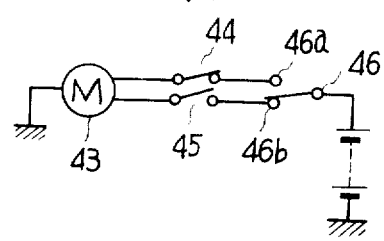
FIG. 16 shows an electric circuit for the above embodiment.

Referring to FIGS. 15 and 16, the strip 5 is of the type which coils around the reel 27 in its free state. The reel 27 is of the type which is rotated by a motor 43 capable of reverse rotation and speed reduction. The motor 43 is controlled by a limit switch 44 which opens when the strip 5 is pulled out over a preset length, the other limit switch 45 which opens when the wound volume has reached a preset value and the door switch 46 which operates according to the movement of the door 2.

When the door 2 is in the closed condition, the door switch 46 is connected with a closed terminal 46b, however the motor 43 is not energized if the wound volume of the strip 5 is over a definite value to open the limit switch 45. When the door 2 is in the open condition, the motor 43 is energized through the limit switch 44 if the door switch 46 is connected with an open terminal 46a. Consequently the strip 5 is wound out from the reel 27 to be inserted into the inner space 1a of the seat belt 1 and to close the limit switch 45. When seat belt 1 is extended to the front of the seat so as to elongate the strip 5 over the preset length, the limit switch 44 opens to stop the rotation of the motor 43. When the door 2 is closed after the occupant has gotten in and out, the door switch 46 is connected with the closed terminal 46b so that the motor 43 is energized through the limit switch 45 to rotate in the reverse direction, therefore the strip 5 is wound around the reel 27 and the seat belt 1 is also retracted by the retractor (not shown). Although the motor 43 is adopted in this embodiment, it is just an example of the driving mechanism for the strip 5 so that the general operation thereof is as same as that in the above embodiments as a whole. Further as the force of the door 2 is utilized in this embodiment, the driving mechanism for the strip 4 is very simple and inexpensive.

Figure 17:
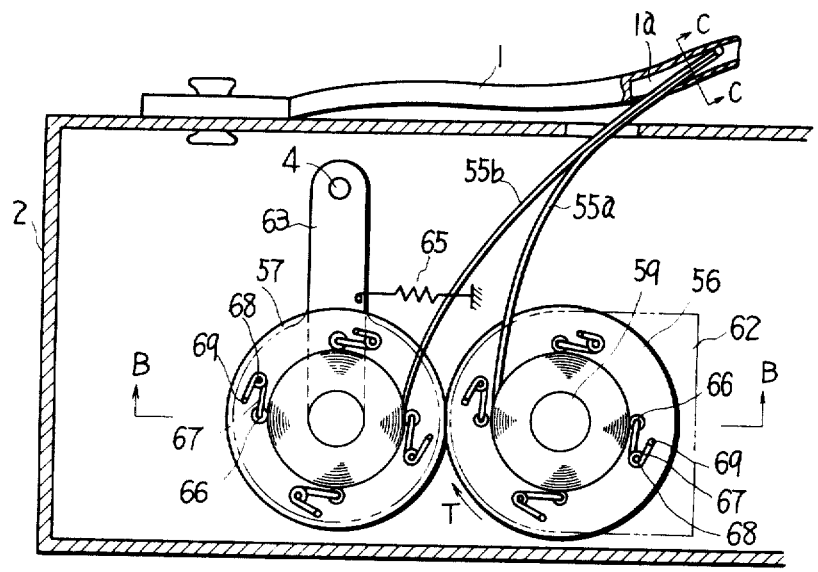
FIG. 17 shows a schematic view of the other embodiment of the passive seat belt system.
Figure 18:
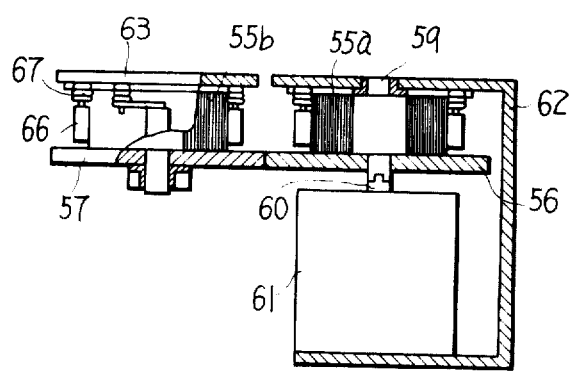
FIG. 18 shows a partial cross-sectional view of the embodiment shown in FIG. 17 taken along the line B—B.
Figure 19:
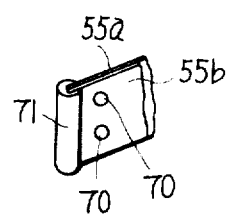
FIG. 19 shows schematic view of the ends of the strips shown in FIG. 17.
Figure 20:
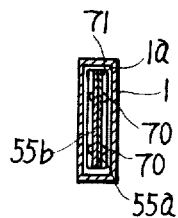
FIG. 20 shows a cross-sectional view of the seat belt in FIG. 17 taken along the line C—C.
Figure 21:
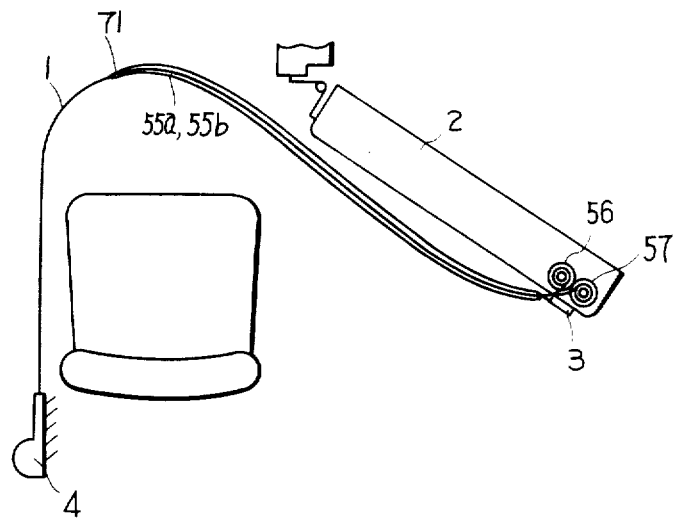
FIG. 21 shows a plan view of the above embodiment in open-door condition.
Figure 22:
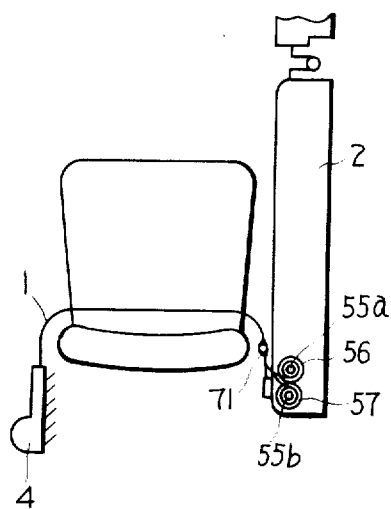
FIG. 22 shows a plan view of the above embodiment in closed-door condition.

Referring next to FIGS. 17 and 18, there are provided thin strips 55a and 55b which are of the type such as clock coil and convex measure having a elasticity in one direction and a rigidity in the other direction. The strips 55a and 55b are wound around the reels 56 and 57 respectively by the self-winding force thereof. The reel 56 is rotatably supported on a retainer 62 fixed on the door 2 and has an axle 59 connected with a shaft 60 of a motor 61 which has a speed reduction mechanism and fixed on the retainer 62. The reel 57 is rotatably supported on a support member 63 which is attached on the door 2 pivotaly around an aperture 64. There is also provided a spring 65, which pulls the support member 63 toward the retainer 62 thereby to bring the reel 56 into contact with the reel 57 so that the driving force of the motor 61 can be transferred to the reel 57 through a friction engagement of the respective periphery of the reels. The diameter of the reel 56 is made a little larger than that of the reel 57 so that the winding speed of the strip 55b may become a little larger than that of the strip 55a. Arms 67 rotatably supported by supporting pins 68 have rollers 66 at one ends while the other ends 69 of which are fixed on the supporting member or retainer so that the rollers 66 push the wound strips 55a and 55b to prevent them from loosening. The strips 55a and 55b are fixed to each other at their one ends by rivets 70 as shown in FIG. 19. At the ends of the strips 55a and 55b there is provided a chip 71 for a smooth insertion of the strips into the inner space 1a. The connected end of the strips is always inserted into the space 1a of the seat belt 1. The motor 61 is capable of reverse rotation. The motor 61 rotates the reel 56 in a direction shown T when the door 2 is opened and rotates the same in the reverse direction when the door 2 is closed, and is controlled to stop the rotation when the length of the wound out strips 55a and 55b or the wound volume on the reels has reached a predetermined value. In FIGS. 21 and 22 showing respectively a state of the seat belt 1 on open-door condition and closed-door condition, the operation of the above embodiment will be explained below. When the door 2 is in closed condition (FIG. 22), the motor 61 does not rotate, so that almost all of the strips 55a and 55b is wound on the reels 56 and 57. Then the seat belt 1 is in a condition shown in FIG. 22, i.e., it is retracted fully by the retractor 4 or in a condition in which the occupant is fairly restrained thereby. On the other hand, when the door 2 is opened, the motor 61 starts rotation to rotate the reel 56 in the direction T in FIG. 17 so that the strip 55a is pulled out from the reel 56. Then on account of the friction engagement of the reels 56 and 57, the strip 55b is also pulled out from the reel 57, therefore both strips 55a and 55b are gradually inserted into the inner space 1a of the seat belt 1 because of the rigidity of themselves. Since the diameter of the reel 56 is larger than that of the reel 57, the extending speed of the strip 55a is smaller than that of the strip 55b. Consequently the strip 55b is pulled out more than the strip 55a, so that they are pulled out with a slight bend toward the reel 56, therefore they proceed in the inner space 1a so as to push the seat belt 1 toward the door 2, overcoming the retracting force of the retractor 4. When the strips 55a and 55b are pulled out over a preset length, the rotation of the motor 61 is stopped, and then, since the strips have pulled out the seat belt 1 enough to provide a space for the occupant, the position of the seat belt 1 becomes suitable for the occupant to get in and out of the vehicle. When the door 2 is closed after the occupant has gotten on and off the vehicle, the motor rotates in the reverse direction to rotate the reel 56 in the reverse direction of T, so that the strips 55a and 55b are retracted by the reels 56 and 57, thereby retracting the seat belt 1 into the retractor 4.

When the retracting volume reaches the predetermined value, the motor 61 stops the rotation to return the system to the initial state shown in FIG. 22. Thereafter the above described motion is repeated in response to the opening and closure of the door 2. In this embodiment, the strips are easily wound on the reels in less power. Because, in case of two strips, the section modulus of each strip becomes one fourth of that of a single strip which is twice as thick as each of the two strips. Therefore the approximate total power for winding the two strips becomes about a half of that for the single strip, while the approximate total power for each of the two strips becomes one fourth of that for the single strip. The number of the strip is not restricted to the above embodiment. This friction engagement type reels can also be driven by the force which is produced when the door is opened. And the system is of course applicable to a shoulder belt and the like.

What we claim is:

1. A passive seat belt system for a motor vehicle comprising:
    a belt coupled at its one end to a vehicle door and having inner thin space therein extending from said one end to the other end;
    a seat belt retractor secured to a floor of a motor vehicle and having a retracting reel rotatably received therein for windingly retaining said belt and a coil spring coupled to said retracting reel for normally biasing said reel in a belt retracting direction;
    belt reinforcing means of flat strip type inserted at its one end into said inner thin space of said belt through an opening provided thereon;
    reel means rotatably mounted in said vehicle door for windingly retaining said belt reinforcing means; and
    driving means mounted in said vehicle door and coupled to said reel means for extending said belt reinforcing means when said vehicle door is opened, said belt reinforcing means extending through said inner thin space in accordance with the extension thereof driven by said driving means, and
    said driving means retracting said belt reinforcing means when said vehicle door is closed, and thereby said belt reinforcing means is retracted from said inner thin space.

2. A passive seat belt system as set forth in claim 1, said belt reinforcing means is made of a thin metal strip having rigidity in one direction and elasticity in the other direction.

3. A passive seat belt system as set forth in claim 1, wherein
    said belt reinforcing means is normally biased in a retracting direction by itself, and
    said driving means includes:
    a shaft fixedly secured to said reel means; and
    a wire connected at its one end to a vehicle body and wound at the other end on said shaft,
    whereby said wire drives said shaft together with said reel means in an extending direction when said vehicle door is opened,
    said wire being restored to its initial condition by the retracting movement of said belt reinforcing means when said vehicle door is closed.

4. A passive seat belt system as set forth in claim 1, wherein said belt reinforcing means is biased in an extending direction by itself, and
    said driving means includes:
    a shaft secured to said reel means; and
    a wire connected at its one end to a vehicle body and wound at the other end thereof on said shaft,
    whereby said wire is extended from shaft when said vehicle door is opened to thereby enable said belt reinforcing means to extend by itself,
    and said wire drives said shaft together with said reel means in a retracting direction when said vehicle door is closed to thereby retract said belt reinforcing means and to restore said wire to its initial condition.

5. A passive seat belt system as set forth in claim 1, wherein said driving means includes:
    an electric motor having a rotary shaft coupled to said reel means; and
    switch means for driving said electric motor in an extending direction when said vehicle door is opened to thereby extend said belt reinforcing means, and for driving said electric motor in a retracting direction when said vehicle door is closed to thereby retract said belt reinforcing means.

6. A passive seat belt system as set forth in claim 1, wherein
    said belt reinforcing means includes a first and a second metal strips coupled together at their respective one ends,
    said reel means includes a first and a second reel for respectively windingly retaining the other ends of said first and second metal strip, said first reel being coupled to said second reel for driving the same at a speed higher than that of said first reel, and
    said driving means includes:
    an electric motor having a rotary shaft coupled to said first reel; and
    switch means for driving said electric motor in an extending direction of said belt reinforcing means when said vehicle door is opened and for driving said electric motor in a rectracting direction of said belt reinforcing means when said vehicle door is closed.

* * * * *